(12) United States Patent
Hente et al.

(10) Patent No.: US 8,508,136 B2
(45) Date of Patent: Aug. 13, 2013

(54) OLED LIGHTING DEVICE WITH TAG ELEMENT

(75) Inventors: Dirk Hente, Wuerselen (DE); Joseph Hendrik Anna Maria Hendrik, Eygelshoven (DE)

(73) Assignee: Koninklijke Philips N.V., Eindhoven (NL)

( * ) Notice: Subject to any disclaimer, the term of this patent is extended or adjusted under 35 U.S.C. 154(b) by 243 days.

(21) Appl. No.: 13/061,617

(22) PCT Filed: Aug. 28, 2009

(86) PCT No.: PCT/IB2009/053762
§ 371 (c)(1),
(2), (4) Date: Mar. 1, 2011

(87) PCT Pub. No.: WO2010/029459
PCT Pub. Date: Mar. 18, 2010

(65) Prior Publication Data
US 2011/0187285 A1    Aug. 4, 2011

(30) Foreign Application Priority Data
Sep. 9, 2008 (EP) ..................... 08105267

(51) Int. Cl.
*H05B 33/08* (2006.01)
*H05B 37/02* (2006.01)
*B60S 1/60* (2006.01)

(52) U.S. Cl.
USPC .......................................... 315/149; 315/133

(58) Field of Classification Search
USPC ................. 315/149, 294, 131–133, 136, 307; 313/323; 362/646
See application file for complete search history.

(56) References Cited

U.S. PATENT DOCUMENTS

| 2004/0056774 | A1  | 3/2004  | Schleicher       |         |
|--------------|-----|---------|------------------|---------|
| 2004/0155608 | A1* | 8/2004  | Trinschek et al. | 315/291 |
| 2007/0247305 | A1  | 10/2007 | Flandre et al.   |         |

FOREIGN PATENT DOCUMENTS

| DE | 19640625 | A1 | 4/1998 |
| DE | 10303454 | A1 | 8/2004 |
| EP | 1244334  | A2 | 9/2002 |
| EP | 1411750  | A2 | 4/2004 |
| EP | 1696707  | A2 | 8/2006 |

OTHER PUBLICATIONS von der Brelie, machine translation of EP169707 (description only), Aug. 30, 2006.*
Dohn et al., machine translation of DE19640625 (description only), Apr. 2, 1998.*
Perez et al: "An Ultra-Low Power, Optically-Interrogated Smart Tagging and Identification"; 4th Annual IEEE Workshop on Automatic Identification Advanced Technologies, Oct. 2005, pp. 187-192.

\* cited by examiner

*Primary Examiner* — Daniel D Chang
(74) *Attorney, Agent, or Firm* — David Zivan; Mark Beloborodov

(57) ABSTRACT

The invention relates to an organic light emitting diode (OLED) device (200) comprising a tag element (201) that encodes operating information about the device, for example its maximal driving current, such that this information can be read out wirelessly and/or electrically by wire but approximately without Ohmic losses. The invention further comprises a socket (600) with a read-out unit (601) for reading out the operating information from such a tag element (201). The tag element may for instance comprise a tag electrode (201) that can capacitively couple to a counter-electrode (601) in the socket.

13 Claims, 2 Drawing Sheets

OLED LIGHTING DEVICE WITH TAG ELEMENT

FIELD OF THE INVENTION

The invention relates to an OLED (organic light emitting diode) lighting device comprising a tag element, a socket compatible with such an OLED device, and a lighting system comprising such an OLED device and socket.

BACKGROUND OF THE INVENTION

From the EP 1 411 750 A2 a lighting system is known with a light emitting diode (LED) that can be plugged to a compatible driving unit. The LED comprises a resistor that is put in parallel to the LED, wherein the resistance of this resistor encodes information about the operating conditions of the LED.

SUMMARY OF THE INVENTION

Based on this background it was an object of the present invention to provide an alternative embodiment of a lighting device, wherein it is desirable that the operation of this device is more robust and economic.

This objective is achieved by an OLED device according to claim 1, a socket according to claim 9, and a lighting system according to claim 13. Preferred embodiments are disclosed in the dependent claims.

According to a first aspect, the invention relates to an OLED device, i.e. a lighting device with an organic light emitting diode (OLED) as light source. The OLED device comprises a "tag element" that encodes operating information about the OLED device (e.g. the nominal current to be supplied to the OLED), wherein the tag element shall be designed such that the operating information can be read out wirelessly and/or electrically by wire but approximately without Ohmic losses. In the latter alternative, the feature "approximately without Ohmic losses" shall refer to the ideal situation that all electrical wires or leads would have zero Ohmic resistance. In reality, this situation can be defined by the requirement that the Ohmic losses associated to the readout of the wires amount to less than 10%, preferably less than 5%, most preferably less than 1% of the total power consumed by the OLED device. A typical example of wirelessly readable tag element would be a radiofrequency (RF) circuit. A typical example of a tag element that can be read out electrically by wire without Ohmic losses would be a capacitor on the OLED device. Further realizations of the tag element will be discussed in connection with preferred embodiments of the invention.

In the described device, the generation of light is based on OLEDs, which are robust, versatile and power efficient light sources. The light output of OLEDs (in terms of intensity, spectral composition etc.) can be controlled by the operating parameters, for instance the current and/or the voltage they are provided with. The tag element allows to encode such parameters as operating information which can then be read out by the drivers the OLED device is coupled to and used to operate the OLED appropriately. In this way it becomes possible to produce OLED devices that have basically the same design (regarding materials, size etc.) but different light output behavior just by encoding in their tag elements different operating information.

The readout of the operating information can be done wirelessly, which is advantageous because it requires no physical or electrical contacts and thus avoids mechanical wear. In case the tag element can be read out by wire, this readout shall be possible without Ohmic losses, thus avoiding an undesirable heating of the OLED device that could interfere with its normal operation. Moreover, power efficiency is improved as no energy is lost to Ohmic loads.

According to a preferred embodiment of the OLED device, the tag element comprises a pattern that can optically be detected. A typical example of such a pattern would be a barcode. An optical pattern has the advantage that it can be detected wirelessly by suitable optical sensors and that it can easily be produced and applied to an OLED device In another embodiment of the invention, the tag element comprises an electrode, called "tag electrode" in the following, which is freely accessible disposed on the surface of the OLED device or disposed below a (thin) dielectric layer. Such a tag element can be read out wirelessly by a capacitive coupling of the tag electrode to a second electrode in a corresponding read-out device.

In the aforementioned embodiment, the effective area of the tag electrode can be used to encode the desired operating information because this area determines the capacitance that can be achieved in combination with a second electrode (of known area) of a read-out device. Though the capacitance is a single scalar value, it may be possible to encode a plurality of operating parameters with it by a suitable one-to-many mapping between the value of the capacitance and the operating parameters.

The tag element may optionally be disposed on the surface of the OLED device, thus being freely accessible to read-out sensors. Moreover, it is possible to apply such a surface tag element to an OLED device after the production of the latter.

Alternatively, the tag element may be covered by an encapsulation, for example the same encapsulation that is usually present to seal the OLED. In case of a tag element that shall optically be detected, the encapsulating material should be transparent.

Particular examples of the operating information that can be encoded by the tag element are driving parameters of the OLED device, for instance: a nominal, minimal and/or maximal driving current, driving power and/or driving voltage; a color-point, a color-temperature, and/or a white-point (particularly for OLED devices with several independently controllable primary colors); or a "dimming enable" flag that determines if the OLED device can be dimmed or not.

The invention further relates to a socket for an OLED device of the kind described above, wherein the term "socket" shall refer to a unit that is mechanically and electrically compatible to the design of the OLED device. Typically it will be possible to plug the OLED device into the socket to achieve a stable mechanical and electrical connection. The socket shall comprise a read-out unit for reading out operating information from the OLED device (or, more precisely, its tag element). In this way it will be possible for the socket and/or a corresponding control device to operate the OLED device in accordance with its specifications.

The aforementioned socket may particularly comprise an optical sensor for optically detecting a pattern on the tag element of an OLED device when this device is mounted to the socket. The optical sensor may for example comprise a light source for irradiating the pattern on the tag element and light sensitive sensors for detecting the light reflected from the pattern.

In another embodiment, the socket may comprise an electrode, called "counter-electrode" in the following, that capacitively couples to a "tag electrode" on an OLED device with such an electrode when this device is mounted to the socket. This approach allows a contactless read-out with minimal power consumption.

The operating information that has been read out from an OLED device can be further used or processed in different ways. A driver can for example only become active if the read operating information is compatible to its specifications. In a preferred embodiment, the socket comprises a control circuit for driving an OLED device mounted to the socket according to the operating information that has been read out from said OLED device. Thus the operating information on the tag element can have a direct effect on the way the OLED device is operated.

The invention further relates to a lighting system comprising an OLED device of the kind described above and a corresponding socket of the kind described above.

These and other aspects of the invention will be apparent from and elucidated with reference to the embodiment(s) described hereinafter. These embodiments will be described by way of example with the help of the accompanying drawings in which:

BRIEF DESCRIPTION OF THE DRAWINGS

Like reference numbers or numbers differing by integer multiples of 100 refer in the Figures to identical or similar components.

DETAILED DESCRIPTION OF EMBODIMENTS

Fluorescent lamps for general illumination are typically offered on the market in terms of "equivalent incandescent power". For a specific socket size a wide range of power levels is offered, for example 25 W, 50 W, 75 W, and 100 W. A customer who desires a specific brightness level can then select a lamp with the desired power value, e.g. for medium brightness a lamp with 50 W. The advantage for the customer is that there is no need for an expensive dimming circuit.

A range of fluorescent lamps with different power levels is technically realized by changing tube diameter, lamp characteristics (e.g. phosphor type) and/or number of tubes. This approach cannot be easily adapted to OLED (organic light emitting diode) devices, where for example the area size of a flat panel OLED is fixed and thus the brightness cannot be reduced by a reduction in area size.

Instead of changing the OLED device design parameters (e.g. area size, organic stack), it is therefore proposed here to use a "tag element" to fix or limit the nominal driving current and/or other operating parameters of the OLED device by "programming" The OLED device can thus electronically automatically be adjusted to a desired "incandescent power level". A driver circuit which is connected to the OLED device should be able to read the tag element and adjusts the supply for the OLED in such a way that a specific luminous intensity or driving current is achieved determined by the tag value. In other words, a set of identical OLED devices, i.e. of the same size and same stack, can be turned into different OLED devices by just changing the operating information on the tag element. Furthermore, it is highly desirable that the OLED tagging is a post processing step. In this case all OLED devices can be manufactured on the same production line without any parameter change, because it is just the tagging which makes the OLED different for the driver.

A typical example for a tag element is a capacitive element. In case of a capacitive tag element that is (as a capacitor) completely disposed on the OLED device, the tag value (capacitance) may be sensed by at least one additional electrical contact which is located on the OLED substrate. Another example of a tag element is a readable optical element. This may for example comprise a bar code which is printed onto the OLED, or the electrical OLED contact may be laser trimmed with markers. In case of the optical tag element, an additional electrical contact can be avoided and the tag value can be detected by an optical sensor located e.g. in a socket.

Figure 1:
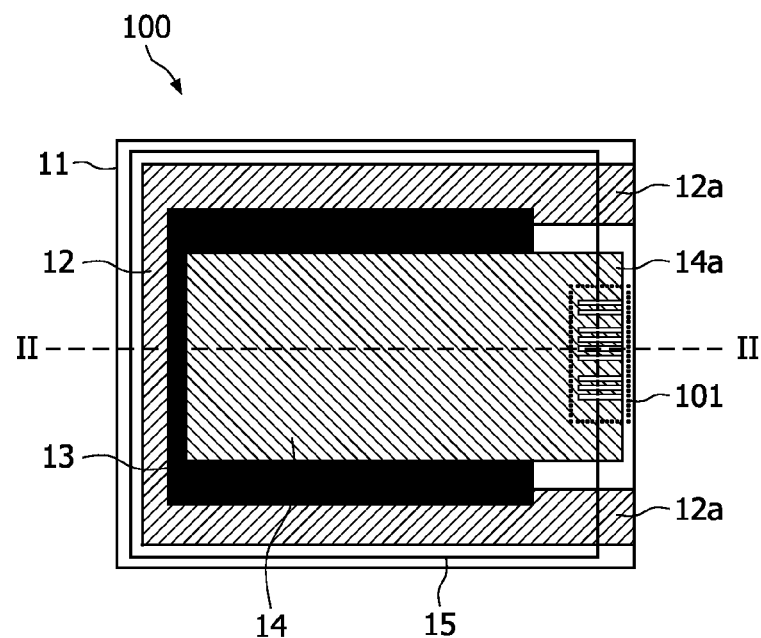
FIG. 1 shows schematically a top view on a first embodiment of an OLED device according to the present invention with an optical tag element.
Figure 2:
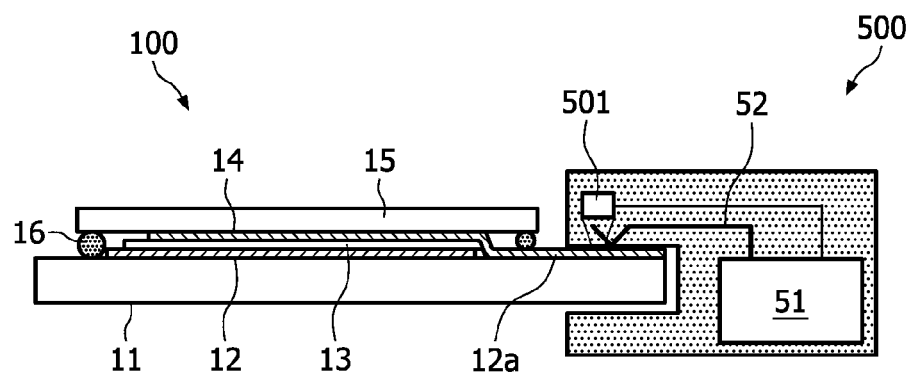
FIG. 2 shows schematically a section through the OLED device across line II-II of FIG. 1.

FIG. 1 shows in more detail an OLED device 100 according to a first exemplary embodiment of the above concepts, and FIG. 2 shows this device 100 after it has been plugged into a corresponding socket 500. The bottom emitting OLED device 100 comprises the following components:

A transparent substrate 11, for example a transparent glass or plastic plate which carries the residual components.

An anode 12 that is disposed on the substrate 11. Edge regions 12a of the anode 12 provide areas for contacting. The anode is made of a transparent conductive material, e.g. indium tin oxide (ITO).

Organic light emitting layers 13 in which the generation of light takes place according to processes known to a person skilled in the art.

A metallic cathode 14 disposed above the organics 13. Edge regions 14a of the cathode 14 provide areas for contacting.

A cover plate 15, for example a glass or plastic plate, which is disposed above the enumerated components upon a sealing 16 to encapsulate the whole lighting device.

As can be seen from FIG. 2, the contact areas 12a (and, similarly, 14a) are in the plugged-in state contacted by contact elements 52 of the socket 500, which are internally connected to a control unit 51 for controlledly providing power to the OLED.

The Figures further show a tag element 101 located in the edge region of the OLED device 100 such it enters into the mounting slot of the socket 500 in the plugged-in state of FIG. 2. The tag element 101 comprises a pattern that can optically be detected by an optical read-out sensor 501 of the socket 500. The pattern may for example be something like a barcode. Since the cathode material for a bottom emitting OLED device is typically a highly reflecting material like silver or aluminum, a part of the cathode area 14a can be used as tag element. Alternatively a bar code pattern could be printed on the OLED substrate. Moreover, the tag element may be located either inside, outside or on both sides of the OLED device encapsulation 15.

The pattern of the tag element 101 can be detected by the optical sensor 501 that is located in the socket 500. The operating information that is encoded by the pattern then determines the current level for the OLED control unit (driver) 51. The current level can therefore be easily changed by printing a different pattern onto the OLED device.

Figure 3:
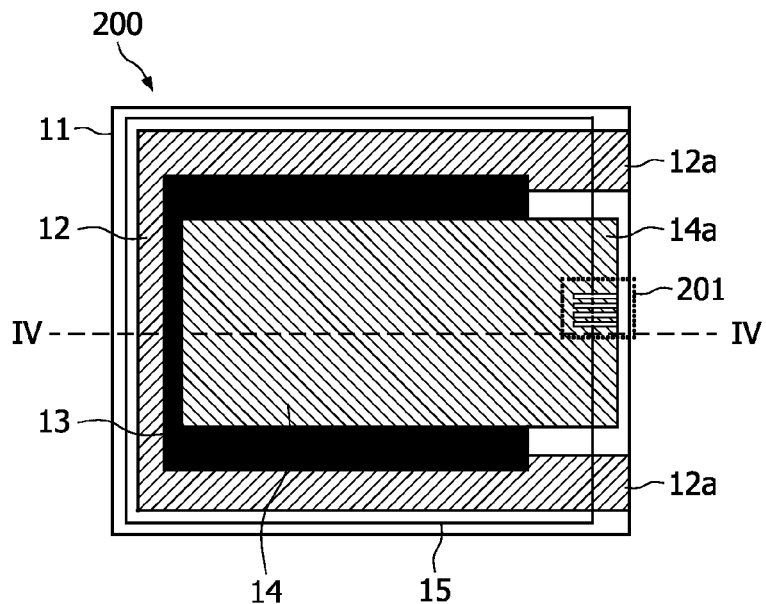
FIG. 3 shows schematically a top view on a second embodiment of an OLED device according to the present invention with a capacitive tag element.
Figure 4:
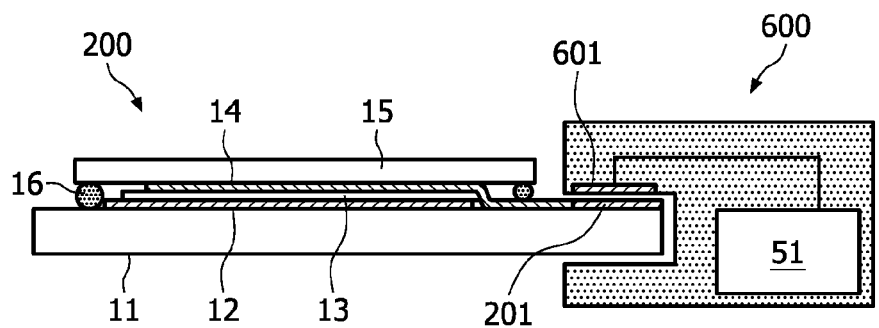
FIG. 4 shows schematically a section through the OLED device across line IV-IV of FIG. 3.
Figure 5:
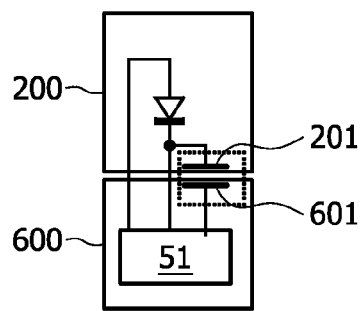
FIG. 5 shows a simplified equivalent circuit for the system of FIG. 4.

FIGS. 3-5 show a second embodiment of a lighting system according to the present invention. Again, FIG. 3 comprises a top view of the OLED device 200, while FIG. 4 shows a section through this device after its insertion into a corresponding socket 600. Components that are similar or identical to those of the previous Figures have the same reference numbers and will not be explained in detail again.

The OLED device 200 differs from that of the previous embodiment in the tag element 201, which is realized here as a "tag electrode". In the shown example, the tag electrode 201 is just a specific sub-area of the cathode 14. When the OLED device 200 is inserted into the corresponding socket 600, the tag electrode 201 lies immediately adjacent to a counter-electrode 601 in the socket 600, with an isolating dielectric between them. The dielectric can be on the tag electrode 201 and/or the counter-electrode 601.

FIG. 5 shows the equivalent circuit for the lighting system of FIG. 4. It can be seen that the tag electrode 201 and the counter-electrode 601 constitute in the plugged-in state a parallel plate capacitor, the capacitance of which can be sensed by the control circuit 51. The capacitance value C is determined by $$C = \in \cdot A/d,$$

where $\in$ denotes the effective permittivity, A the effective electrode area size, and d the distance between both electrodes 201, 601. By changing the size and/or patterning of the tag electrode 201, the capacitance value can be changed as desired to encode operating information of the OLED device 200.

In the described OLED devices, the tag element limits and/or uniquely determines the nominal current of the attached device driver and/or other operating parameters. The tag value can preferably be adjusted as a post processing step during or after OLED manufacturing. The tag element may be located on the OLED substrate and, optionally, be enclosed by the OLED encapsulation.

Finally it is pointed out that in the present application the term "comprising" does not exclude other elements or steps, that "a" or "an" does not exclude a plurality, and that a single processor or other unit may fulfill the functions of several means. The invention resides in each and every novel characteristic feature and each and every combination of characteristic features. Moreover, reference signs in the claims shall not be construed as limiting their scope.

The invention claimed is:

1. An OLED device having an electrode area and comprising a tag element that encodes operating information about the device, the tag element comprising a pattern that constitutes at least a portion of the electrode area, wherein said information is at least one of readable wirelessly or readable electrically by wire.

2. The OLED device according to claim 1, wherein the pattern is optically detectable.

3. The OLED device according to claim 2, wherein the pattern is a barcode.

4. The OLED device according to claim 1, wherein the tag element comprises a tag electrode on the surface of the device or below a dielectric layer.

5. The OLED device according to claim 4, wherein the operating information is encoded in an effective area of the tag electrode.

6. The OLED device according to claim 1, wherein the tag element is disposed on the surface of the device.

7. The OLED according to claim 1, wherein the tag element is covered by an encapsulation.

8. The OLED device according to claim 1, wherein the operating information comprises a plurality of driving parameters of the OLED device, including at least one of a nominal driving current, a minimal driving current, a maximal driving current, a driving power, a driving voltage, a color-point of the OLED device, a color temperature of the OLED device, a white point of the OLED device, or a parameter related to dimming of the OLED device.

9. A socket for an OLED device according to claim 1, comprising a read-out unit for reading out operating information from the OLED device.

10. The socket according to claim 9, further comprising an optical sensor for optically detecting the pattern carried by a tag element of OLED device when the latter is mounted to the socket.

11. The socket according to claim 9, further comprising a read-out electrode that capacitively couples to the electrode of the OLED device when the latter is mounted to the socket.

12. The socket according to claim 9, further comprising a control circuit for driving the OLED device mounted to the socket according to operating information read out from said OLED device.

13. A set of OLED devices according to claim 1, wherein:
each OLED device comprises a tag element that encodes operating information about the device, wherein said information is at least one of readable wirelessly or readable electrically by wire; and
different operating information is encoded in the tag elements such that the OLED devices have different light output behavior when being operated according to said operating information.

* * * * *